United States Patent
Holst et al.

(10) Patent No.: US 11,199,231 B2
(45) Date of Patent: Dec. 14, 2021

(54) TRACTION DRIVE FOR A MOTOR VEHICLE TRANSMISSION

(71) Applicant: ZF Friedrichshafen AG, Friedrichshafen (DE)

(72) Inventors: Sven Holst, Meckenbeuren (DE); Uwe Firzlaff, Uhldingen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 84 days.

(21) Appl. No.: 16/123,403

(22) Filed: Sep. 6, 2018

(65) Prior Publication Data

US 2019/0072141 A1  Mar. 7, 2019

(30) Foreign Application Priority Data

Sep. 7, 2017  (DE) .................. 10 2017 215 786.0

(51) Int. Cl.
| | |
|---|---|
| *F16D 48/02* | (2006.01) |
| *F16D 25/10* | (2006.01) |
| *B60K 6/387* | (2007.10) |
| *B60K 6/40* | (2007.10) |

(52) U.S. Cl.
CPC ......... *F16D 48/0206* (2013.01); *F16D 25/10* (2013.01); *B60K 6/387* (2013.01); *B60K 6/40* (2013.01)

(58) Field of Classification Search
CPC .. B62K 6/40; B60K 6/48; B60K 6/387; Y02T 10/6221; B62M 6/55; F16H 7/00
USPC .......................... 474/198, 199, 165
See application file for complete search history.

(56) References Cited

U.S. PATENT DOCUMENTS

| | | | | |
|---|---|---|---|---|
| 3,321,040 A | * | 5/1967 | Kouzuki ................. | B62M 9/10 180/219 |
| 3,985,038 A | * | 10/1976 | Fowler ................. | A01D 61/008 474/136 |
| 4,541,500 A | * | 9/1985 | Gelhard ................. | B62M 6/60 180/205.2 |
| 4,585,431 A | * | 4/1986 | Umeda ............... | B62D 55/0963 474/161 |
| 5,875,691 A | * | 3/1999 | Hata ..................... | B60K 6/365 475/5 |
| 6,008,545 A | * | 12/1999 | Nagano ................. | B60K 6/485 290/1 C |

(Continued)

FOREIGN PATENT DOCUMENTS

| | | |
|---|---|---|
| DE | 10035431 A1 | 4/2001 |
| EP | 0911514 A1 | 4/1999 |
| WO | WO 2005/123434 A1 | 12/2005 |

OTHER PUBLICATIONS

EP Search Report EP17189840, dated Feb. 27, 2018, (2 pages).

*Primary Examiner* — Henry Y Liu
(74) *Attorney, Agent, or Firm* — Dority & Manning, P.A.

(57) ABSTRACT

A flexible traction drive mechanism for a motor vehicle transmission includes a first traction mechanism wheel which can be rotationally fixed to a first transmission component, a second traction mechanism wheel which is drivingly connected to the first traction mechanism wheel by a traction mechanism and can be rotationally fixed to a second transmission component, and a bearing journal for supporting the first traction mechanism wheel. The first traction mechanism wheel is arranged so as to be axially movable relative to the bearing journal.

21 Claims, 6 Drawing Sheets

(56) References Cited

U.S. PATENT DOCUMENTS

| | | | | |
|---|---|---|---|---|
| 6,196,347 B1* | 3/2001 | Chao | B62M 6/50 | 180/206.2 |
| 6,332,257 B1* | 12/2001 | Reed, Jr. | B60K 6/26 | 29/401.1 |
| 6,464,028 B1 | 10/2002 | Imani | | |
| 6,655,484 B2* | 12/2003 | Levin | B60K 6/22 | 180/65.25 |
| 6,976,551 B2* | 12/2005 | Spanski | B62M 6/10 | 180/206.2 |
| 7,040,441 B1* | 5/2006 | Karaba | B62K 11/04 | 180/205.6 |
| 7,568,714 B2* | 8/2009 | Sasnowski | B62M 6/55 | 180/206.4 |
| 7,690,280 B2* | 4/2010 | Chapelon | B60K 6/387 | 192/48.611 |
| 7,753,157 B1* | 7/2010 | Woods | B62K 11/06 | 180/205.5 |
| 8,043,185 B2* | 10/2011 | Nicolai | B62M 25/08 | 475/154 |
| 8,616,087 B2* | 12/2013 | Sayama | B60K 6/36 | 74/339 |
| 9,789,929 B2* | 10/2017 | Wu | B62M 6/55 | |
| 2004/0014543 A1* | 1/2004 | Van Der Linde | B62M 11/06 | 474/160 |
| 2004/0055800 A1* | 3/2004 | Katou | B60K 6/485 | 180/65.26 |
| 2004/0154846 A1 | 8/2004 | Kira | | |
| 2005/0176535 A1* | 8/2005 | Matsumoto | B62M 11/145 | 474/78 |
| 2005/0176536 A1* | 8/2005 | Matsumoto | B62M 9/131 | 474/78 |
| 2010/0133020 A1* | 6/2010 | Matsui | B62D 55/125 | 180/9.64 |
| 2016/0123452 A1* | 5/2016 | Modisett | F16H 7/06 | 74/665 GE |
| 2017/0233037 A1* | 8/2017 | Hara | B62M 9/10 | 474/78 |

* cited by examiner

TRACTION DRIVE FOR A MOTOR VEHICLE TRANSMISSION

FIELD OF THE INVENTION

The invention relates generally to a flexible traction drive mechanism for a motor vehicle transmission, including a first traction mechanism wheel, for example, a gear or pulley, which can be rotationally fixed to a first transmission component, a second traction mechanism wheel which is drivingly connected to the first traction mechanism wheel by a traction mechanism, for example, a belt or chain, and can be rotationally fixed to a second transmission component, and a bearing journal for supporting the first traction mechanism wheel.

The invention also relates generally to a motor vehicle transmission including such flexible traction drive mechanism. In addition, the invention relates generally to a motor vehicle including such flexible traction drive mechanism or the motor vehicle transmission.

BACKGROUND

The use of a flexible traction drive mechanism in a motor vehicle transmission is known from the prior art. For example, WO 2005/123 434 A1 describes a chain drive, in the case of which a first traction mechanism wheel is rotationally fixed to a rotor shaft of an electric machine. A second traction mechanism wheel is drivingly connected to a transmission input shaft by a dual clutch. The first traction mechanism wheel is also drivingly connected to the second traction mechanism wheel by a chain.

During the operation of the transmission, there can be times when the transmission input shaft and/or the dual clutch and, therefore, the second traction mechanism wheel move in the axial direction. The resultant axial offset between the first traction mechanism wheel and the second traction mechanism wheel is compensated for by the individual links of the chain. The disadvantage of such arrangement, however, is that the compensation of the axial offset between the first and the second traction mechanism wheels results in high wear of the chain. In addition, the chain must have a certain length, so that the chain can compensate for the axial offset between the first traction mechanism wheel and the second traction mechanism wheel. As a result, the flexible traction drive mechanism has a certain size, and therefore the flexible traction drive mechanism cannot be utilized with transmissions having little installation space.

SUMMARY OF THE INVENTION

Example aspects of the invention provide a flexible traction drive mechanism, in the case of which less wear occurs and which can be utilized in transmissions having little installation space.

The problem addressed by example aspects of the invention is solved by a flexible traction drive mechanism of the type mentioned above, in which the first traction mechanism wheel is arranged so as to be axially moveable relative to the bearing journal.

The flexible traction drive mechanism according to example aspects of the invention has the advantage that, due to the axial movability of the first traction mechanism wheel, no axial offset occurs between the first traction mechanism wheel and the second traction mechanism wheel. Therefore, in the case of the flexible traction drive mechanism according to the invention, the traction mechanism does not have to compensate for axial offset between the first traction mechanism wheel and the second traction mechanism wheel, which increases the service life of the traction mechanism. Yet another advantage is that the flexible traction drive mechanism can be designed to be compact, because the axial offset between the first traction mechanism wheel and the second traction mechanism wheel is no longer compensated for by the traction mechanism, but rather by the axial movement of the first traction mechanism wheel relative to the bearing journal. Therefore, the flexible traction drive mechanism can include a short traction mechanism and, therefore, can be utilized in transmissions having limited available installation space.

A traction mechanism can be understood to be a power transmission mechanism which can be loaded in tension in a linear direction in order to transmit a force from the first traction mechanism wheel to the second traction mechanism wheel. For example, a traction mechanism can be a chain which includes chain links including openings, into which individual positive engagement mechanisms of the traction mechanism wheels engage. Alternatively thereto, the traction mechanism can also be designed as a belt, in particular as a toothed belt.

The direction indications "axial" and "radial" refer to a central axis of the transmission, unless indicated otherwise. The central axis can correspond, for example, to the axis of rotation of an input shaft of the transmission.

In one particular version, the first traction mechanism wheel can have a smaller diameter than the second traction mechanism wheel. As a result, a ratio between the first transmission component and the second transmission component can be implemented in an easy way.

The bearing journal and a transmission housing of the transmission can be designed as a single piece. Therefore, the bearing journal can be an integral part of the transmission housing. The transmission housing is stationary during the operation of the flexible traction drive mechanism and does not rotate. Alternatively, the bearing journal can include a fastening portion which can be connected, in a form-fit and/or friction-locking manner, to another fastening portion of the transmission housing. In particular, the bearing journal can be connected to the transmission housing by a bolted connection. As a result, a re-breakable or removable connection between the bearing journal and the transmission housing can be implemented.

In yet another alternative version, the flexible traction drive mechanism can include a connecting mechanism which can be re-breakably or removably connected to the bearing journal by which the bearing journal can be connected to the transmission housing in a form-fit and/or friction-locking manner. The connecting mechanism can be a hollow screw which can be re-breakably or removably connected to the transmission housing by a bolted connection. In addition, the connecting mechanism can be re-breakably or removably connected to the bearing journal by a form-fit and/or friction-locking connection. The bearing journal can enclose, at least partially, in particular completely, one part of the connecting mechanism, in particular the hollow screw. The connecting mechanism can be arranged coaxially to the bearing journal.

In one particular version, the flexible traction drive mechanism can include a bearing, by which the first traction mechanism wheel is supported on the bearing journal, in particular exclusively, in the radial direction. The bearing can be a needle bearing. In addition, the bearing can be designed in such a way that the bearing permits an axial movement of the first traction mechanism wheel relative to the bearing journal.

In order to ensure that the wear of the bearing and/or of the first traction mechanism wheel and/or of the bearing journal is low during an axial movement of the first traction mechanism wheel relative to the bearing journal, a thrust race for the first traction mechanism wheel can be provided. The thrust race can be machined, for example, hardened, and/or can consist of a material such that the wear is minimized during a movement of the first traction mechanism wheel relative to the bearing journal. The thrust race can be an integral part of the bearing journal. Therefore, the wear of the bearing can be reduced during a movement of the bearing and/or of the first traction mechanism wheel in the axial direction.

The bearing journal can include an, in particular circumferential, support area which forms the thrust race. Therefore, wear of the first traction mechanism wheel can be reduced when the first traction mechanism wheel rests against the support area. The support area can project in the radial direction away from the remaining area of the bearing journal.

The flexible traction drive mechanism can include a bush which at least partially, in particular completely, encloses the bearing journal, in particular a part of the bearing journal, and includes the thrust race. The bush can include an, in particular circumferential, collar for axially supporting the first traction mechanism wheel. In this case, the thrust race can additionally be an integral part of the collar. This offers the advantage that the wear of the first traction mechanism wheel and/or of the bearing is reduced when the first traction mechanism wheel and/or the bearing rests against the collar.

In one particular version, oil from an oil line extending through the bearing journal in the axial direction can be fed to the bearing. As a result, lubrication of the bearing can be achieved in an easy way.

In particular, the oil located in the oil line can be fed through a bore hole, which is located in the bearing journal, to the bearing. Alternatively, the bore hole can be arranged in the connecting mechanism. The connecting mechanism can include a part of the oil line. Alternatively, the bore hole can be arranged in a coupling piece which is fluidically installed downstream from the connecting mechanism and includes another part of the oil line. Versions are also possible, of course, in which the respective component includes multiple bore holes. The bore holes can be spaced apart from each other along the circumferential direction of the respective component. The coupling piece, the connecting piece, and the bearing journal can be arranged coaxially to each other. The bearing journal can, in particular completely, enclose a part of the coupling piece.

The flexible traction drive mechanism can include an oil guide member which is arranged and designed in such a way that it diverts the oil which has flowed through the bearing in the direction of the traction mechanism. The oil guide member can be connected, in particular as a single piece, to the bush. In particular, the oil guide member can be arranged at one end of the bush and/or can be rotationally fixed to the end of the bush. Alternatively, the oil guide member can be arranged on the bearing journal, in particular on the support area of the bearing journal, and/or can be rotationally fixed to the bearing journal. By the oil guide member, it can be ensured in an easy way that the oil which has flowed through the bearing is applied to the traction mechanism.

The first traction mechanism wheel can include one other bore hole, in particular multiple other bore holes, through which the oil which has flowed through the bore hole flows out of the first traction mechanism wheel. In addition, the first traction mechanism wheel can include yet another oil guide member which diverts the oil which has flowed through the other bore hole in the direction of the traction mechanism. Due to the further oil guide member, it is ensured that oil is applied to another side of the traction mechanism. In the end, due to the oil guide member and the further oil guide member, oil is applied to the traction mechanism from both axial sides of the traction mechanism.

The bore hole and/or the other bore hole can be arranged upstream from the bearing. The other bore hole can be arranged downstream from the bore hole. In this case, an accommodating chamber enclosed by the first traction mechanism wheel can be present, into which the oil which has flowed out of the bore hole flows. Originating from the accommodating chamber, a portion of the oil can flow to the bearing and another portion of the oil can flow out of the first traction mechanism wheel through the other bore hole.

Of particular advantage is a motor vehicle transmission including a flexible traction drive mechanism according to example aspects of the invention. In this case, the first traction mechanism wheel can be rotationally fixed to the first transmission component. The second traction mechanism wheel can be rotationally fixed, in particular welded, to the second transmission component. The first transmission component can be a rotor shaft of the electric machine.

A rotationally fixed connection is understood to be a connection between two elements, which is formed and arranged in such a way that the two elements, which are operatively connected to each other, always have the same rotational speed. This is not the case, for example, when a shift element in the disengaged condition is arranged between the two interconnected elements. The rotationally fixed connection can be implemented, for example, in the form of a spline.

The electric machine includes at least a stator and a rotatably mounted rotor and is configured for converting electrical energy into mechanical energy in the form of rotational speed and torque when operated as a motor and for converting mechanical energy into electrical energy in the form of current and voltage when operated as a generator.

A rotor shaft is referred to as a shaft which is rotationally fixed to the rotor of the electric machine. In this case, the rotor can be arranged on the rotor shaft.

The second transmission component can be a shaft which is rotationally fixed to the second traction mechanism wheel. Alternatively, the second transmission component can be a clutch component of a clutch, in particular a dual clutch or a triple clutch. The clutch component can be, for example, a disk carrier. During operation of the transmission, the second transmission component and, therefore, the second traction mechanism wheel can move in the axial direction.

The first transmission component and the second transmission component can be radially offset with respect to each other. In particular, a central axis of the rotor shaft can be offset in the radial direction with respect to a central axis of the shaft of the second transmission component or with respect to a central axis of the clutch.

Of particular advantage is also a motor vehicle including a flexible traction drive mechanism or a motor vehicle transmission. The motor vehicle transmission can be an automatic transmission, by which multiple gears can be implemented with a different ratio between a transmission input shaft and a transmission output shaft.

BRIEF DESCRIPTION OF THE DRAWINGS

The subject of the invention is schematically represented in the figures and is described in the following with reference to the figures, wherein identical or identically operating elements are mostly provided with the same reference characters. Wherein.

DETAILED DESCRIPTION

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 1:
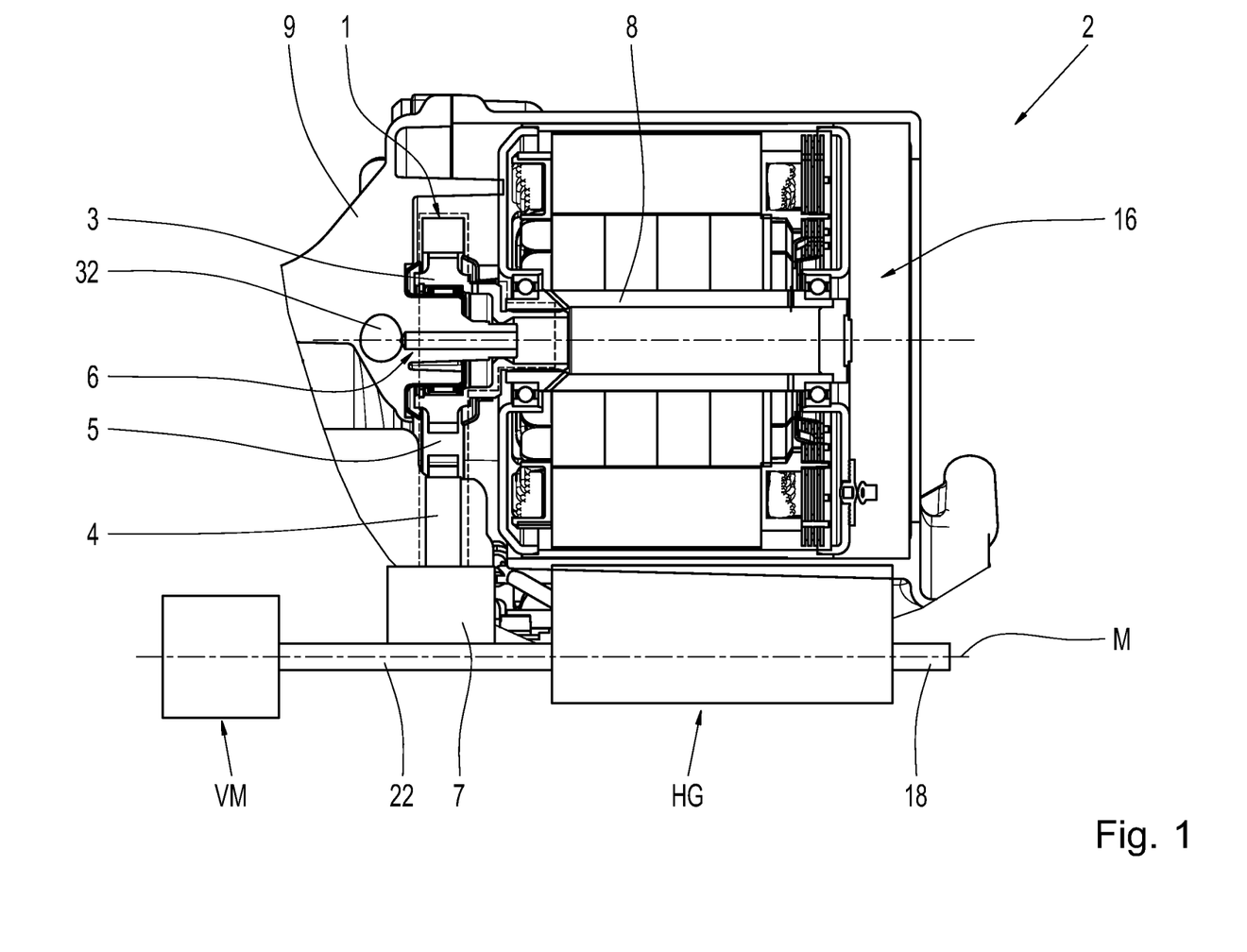
FIG. 1 shows a sectioning of the transmission according to the invention including the flexible traction drive mechanism according to the invention, according to a first exemplary embodiment.

FIG. 1 shows one part of a motor vehicle transmission 2 including a flexible traction drive mechanism 1. The flexible traction drive mechanism 1 includes a first traction mechanism wheel 3 which is rotationally fixed to a first transmission component 8. The first transmission component 8 is a rotor shaft of an electric machine 16. The flexible traction drive mechanism 1 includes a bearing journal 6 for supporting the first traction mechanism wheel 3. The first traction mechanism wheel 3 is arranged so as to be axially movable relative to the bearing journal 6. The bearing journal 6 is designed as a single piece with a transmission housing 9. In this case, the bearing journal 6 protrudes in the axial direction from an inner wall of the transmission housing 9.

In addition, the flexible traction drive mechanism 1 includes a second traction mechanism wheel 4 which is drivingly connected to the first traction mechanism wheel 3 by a traction mechanism 5 in the form, for example, of a chain. The second traction mechanism wheel 4 is rotationally fixed to a second transmission component 7. The second transmission component 7 is a clutch component which is not represented in greater detail in FIG. 1, such as a disk carrier, a dual clutch, a triple clutch, a torque converter, or a clutch housing. The second transmission component 7 can move axially during operation of the transmission 2.

The second transmission component 7 is drivingly connected to a transmission input shaft 22. The transmission input shaft 22 is drivingly connected to a motor vehicle drive unit VM, such as an internal combustion engine. In addition, the transmission input shaft 22 is drivingly connected to at least one integral part of a main transmission HG. The main transmission HG includes, for example, gear sets and shift elements which are not represented in greater detail in FIG. 1. A transmission output shaft 18 is drivingly connected at least to one of the integral parts of the main transmission HG. By controlling one or more of the shift elements of the main transmission HG, multiple gears, each having a different ratio, between the transmission input shaft 22 and the transmission output shaft 18 can be implemented.

The design represented in FIG. 1 is to be considered merely as an example. A separating clutch, a dual clutch, a triple clutch, or a torque converter including a torque converter lockup clutch can be additionally arranged between the motor vehicle drive unit VM and the second transmission component. The transmission output shaft 18 and the transmission input shaft 22 can be arranged on the same axial end of the main transmission HG. The transmission output shaft 18 and the transmission input shaft 22 can have axes of rotation that differ from one another, as in the case, for example, of a transmission for a front-transverse drive or a rear-transverse drive of a motor vehicle. The design represented in FIG. 1 therefore serves merely as an example, and does not limit the design of the flexible traction drive mechanism according to the invention.

The electric machine 16 and the second transmission component 7 are offset with respect to each other in the radial direction relative to a central axis M of the transmission 2.

Figure 2:
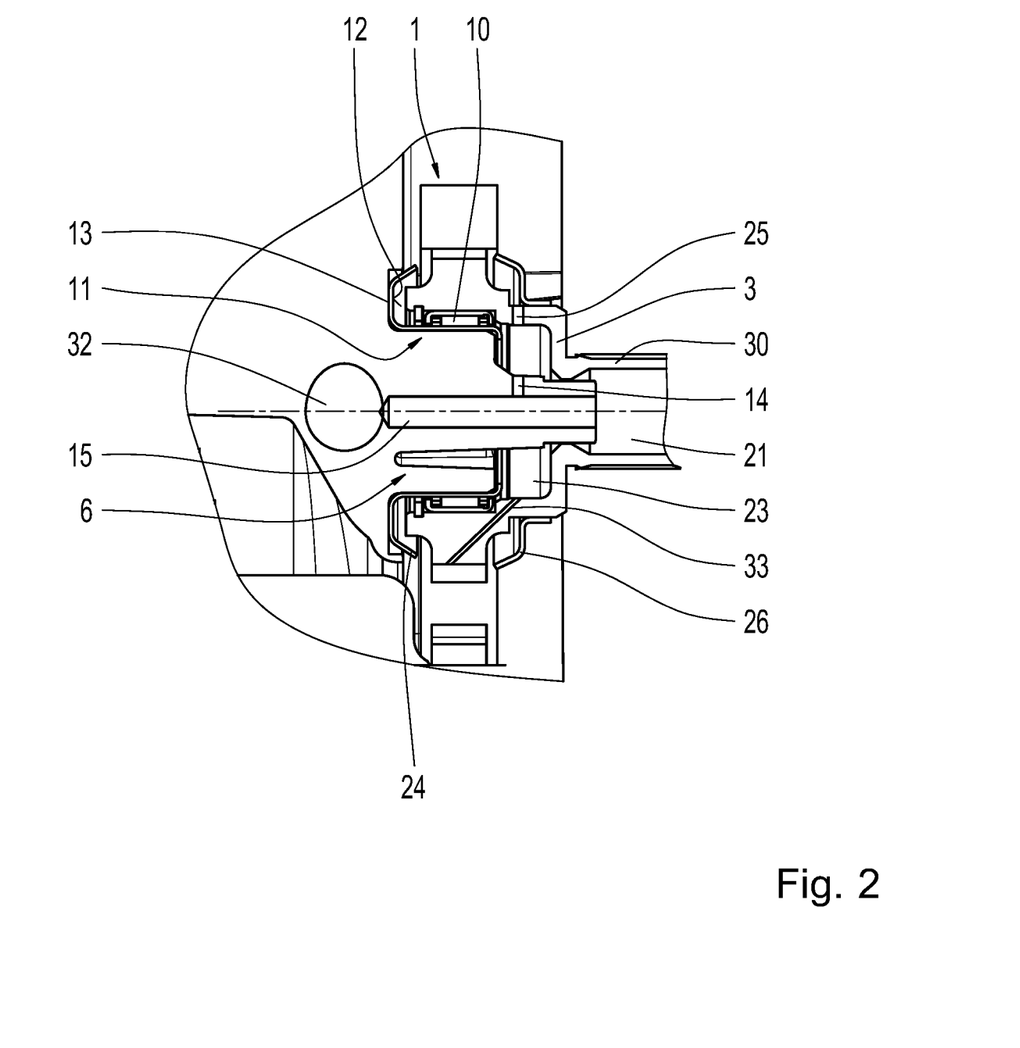
FIG. 2 shows an enlarged representation of one part of the flexible traction drive mechanism according to the invention, according to the first exemplary embodiment.

FIG. 2 shows an enlarged representation of one part of the flexible traction drive mechanism 1. The flexible traction drive mechanism 1 includes a bearing 10, by which the first traction mechanism wheel 3 is supported on the bearing journal 6 in the radial direction. The bearing 10 is a needle bearing which permits an axial movement of the first traction mechanism wheel 3 relative to the bearing journal 6.

The bearing 10 rests directly on a bush 11 which encloses a part of the bearing journal 6 and is arranged radially between the bearing 10 and the bearing journal 6. The bush 11 includes, at one end, a circumferential, radially protruding collar 13 which acts as a thrust race 12 for axially supporting the first traction mechanism wheel 3.

The bearing journal 6 includes an oil line 15. One end of the oil line 15 is fluidically connected to yet another oil line 32 of the transmission 1. The further oil line 32 is arranged within the transmission housing 9 and/or is fluidically connected to a main oil line (not represented). By the main oil line, not only the electric machine 16, but also further components of the transmission 2, which are not represented in the figures, are supplied with oil. The oil line 15 opens, at its other end, in a cavity 21 enclosed by the first traction mechanism wheel 3. The cavity 21 is partially delimited by a coupling portion 30 of the first traction mechanism wheel 3. The coupling portion 30 is an integral part of the first traction mechanism wheel 3 and is rotationally fixed to the rotor shaft.

The bearing journal 6 includes a bore hole 14, through which the oil located in the oil line 15 flows into an accommodating chamber 23 delimited by the first traction mechanism wheel 3. One portion of the oil which has flowed into the accommodating chamber 23 subsequently flows through the bearing 10 to the collar 13. The collar 13 includes, at one end, an oil guide member 24 which is configured for diverting the oil which has flowed through the bearing 10 in the direction of the traction mechanism 5.

The first traction mechanism wheel 3 also includes at least one other bore hole 25, through which a portion of the oil which has flowed into the accommodating chamber 23 flows out of the first traction mechanism wheel 3. The first traction mechanism wheel 3 includes yet another oil guide member 26 which is designed and arranged in such a way that it diverts the oil which has flowed out of the other bore hole 25 in the direction of the traction mechanism 5. As a result, the traction mechanism 5 can be cooled and lubricated.

Optionally, at least one additional bore hole 33 is provided in the first traction mechanism wheel 3. One portion of the oil which has flowed into the accommodating chamber 23 can be directly guided to the traction mechanism toothing formed on the traction mechanism wheel 3 through the at least one additional bore hole 33.

Figure 3:
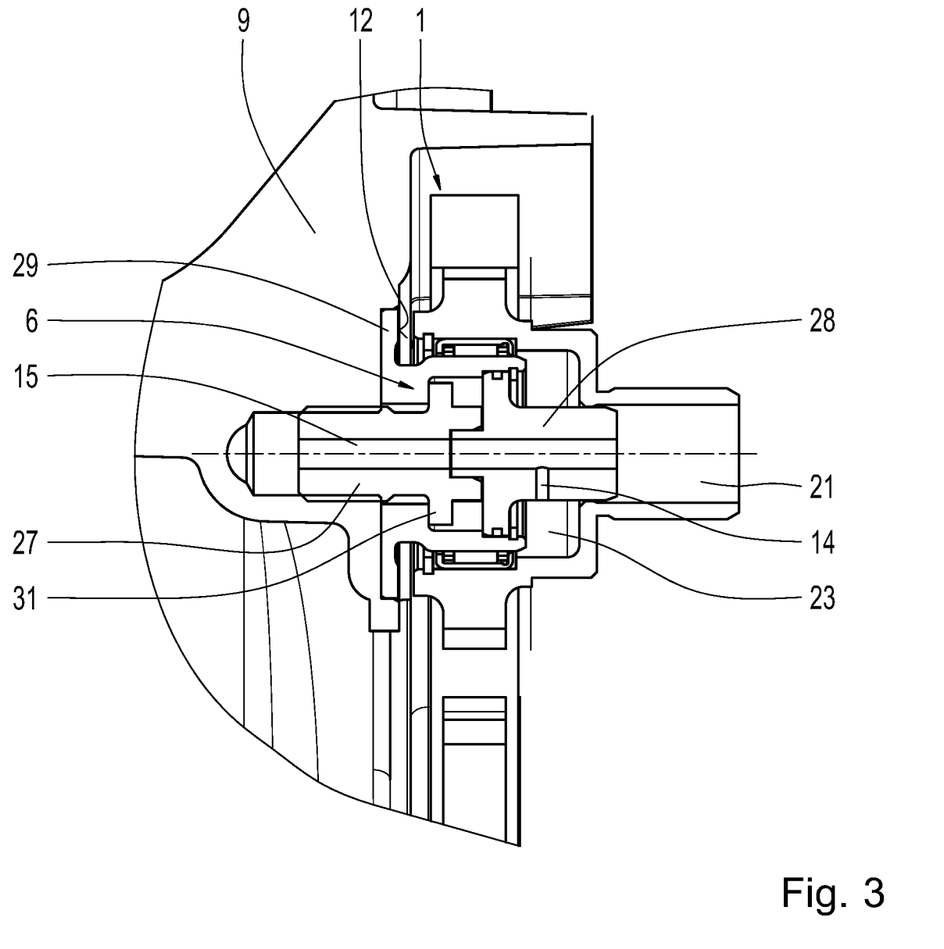
FIG. 3 shows an enlarged representation of one part of a flexible traction drive mechanism according to the invention, according to a second exemplary embodiment.

FIG. 3 shows an enlarged representation of one part of the flexible traction drive mechanism 1 according to a second exemplary embodiment. The represented flexible traction drive mechanism 1 differs from the flexible traction drive mechanism 1 represented in FIG. 1 in that the bearing journal 6 and the transmission housing 9 are not designed as a single piece, but rather as two pieces.

The bearing journal 6 is breakably connected to the transmission housing 9 by a connecting mechanism 27 in the form of a hollow screw. The connecting mechanism 27 includes, at one end, an external thread which is engaged with an internal thread of the transmission housing 9. In addition, the connecting mechanism 27 includes a circumferential projection 31 which, in the assembled condition of the flexible traction drive mechanism 1, presses the bearing journal 6 against the transmission housing 9. The connecting mechanism 27 includes one part of the oil line 15.

Yet another difference is that, in the exemplary embodiment according to FIG. 3, a coupling piece 28 is present, which includes the bore hole 14 and another part of the oil line 15. In this case, one end of the coupling piece 28 is connected to the connecting mechanism 27 and is arranged downstream from the connecting mechanism 27. Another end of the coupling piece 28 protrudes into the cavity 21. In particular, the coupling piece 28 is arranged and designed in such a way that the other part of the oil line 15 is fluidically connected to the cavity 21. The coupling piece 28 prevents all the oil from flowing out of the connecting mechanism 27 into the accommodating chamber 23. The coupling piece 28, the connecting mechanism 27, and the bearing journal 6 are arranged coaxially to each other. The further oil line 32 is not represented in FIG. 3.

Yet another difference is that the flexible traction drive mechanism 1 according to the exemplary embodiment represented in FIG. 3 does not include a bush 11. In this case, the bearing journal 6 includes a support area 29 which forms the thrust race 12 for axially supporting the first traction mechanism wheel 3. The support area 29 projects in the radial direction away from the remaining bearing journal 6. The flexible traction drive mechanism according to FIG. 3 can nevertheless include—as shown in FIG. 2—at least one additional bore hole 33 and/or at least one of the oil guide members 24, 26. The oil guide member 24 can be formed, for example, on the bearing journal 6.

Figure 4:
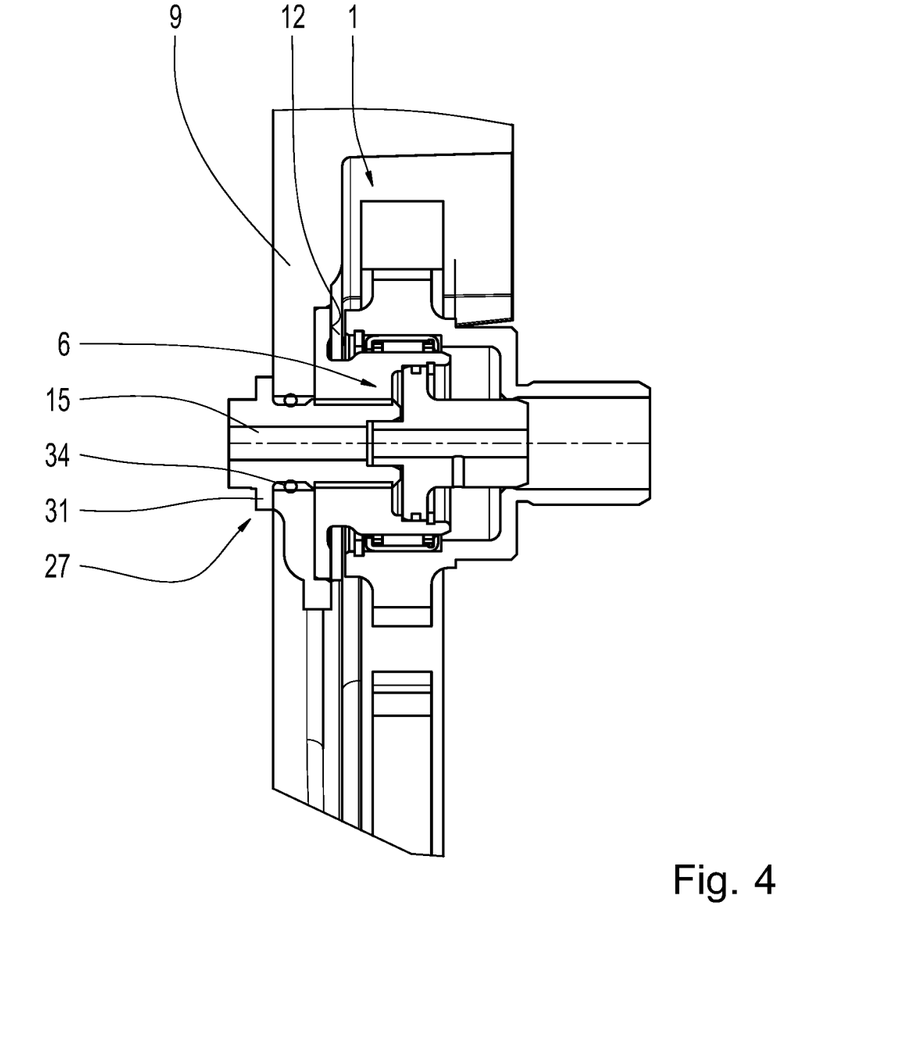
FIG. 4 shows an enlarged representation of one part of a flexible traction drive mechanism according to the invention, according to a third exemplary embodiment.

FIG. 4 shows an enlarged representation of one part of the flexible traction drive mechanism 1 according to a third exemplary embodiment. The represented flexible traction drive mechanism 1 differs from the flexible traction drive mechanism 1 represented in FIG. 3 in the design of the connecting mechanism 27, in particular in the connection of the connecting mechanism 27 to the transmission housing 9 and to the bearing journal 6.

The connecting mechanism 27 shown in FIG. 4, for example, is connected to the bearing journal 6 by a bolted connection. In the assembled condition of the flexible traction drive mechanism 1, the projection 31 of the connecting mechanism 27 rests against the transmission housing 9; the seal is implemented by an O-ring 34. The oil line 15 is connected to yet another oil line 32 (not represented), wherein the further oil line 32 is not arranged in the transmission housing 9.

The flexible traction drive mechanism according to FIG. 4 can nevertheless include—as shown in FIG. 2—at least one additional bore hole 33 and/or at least one of the oil guide members 24, 26. The oil guide member 24 can be formed, for example, on the bearing journal 6.

Figure 5:
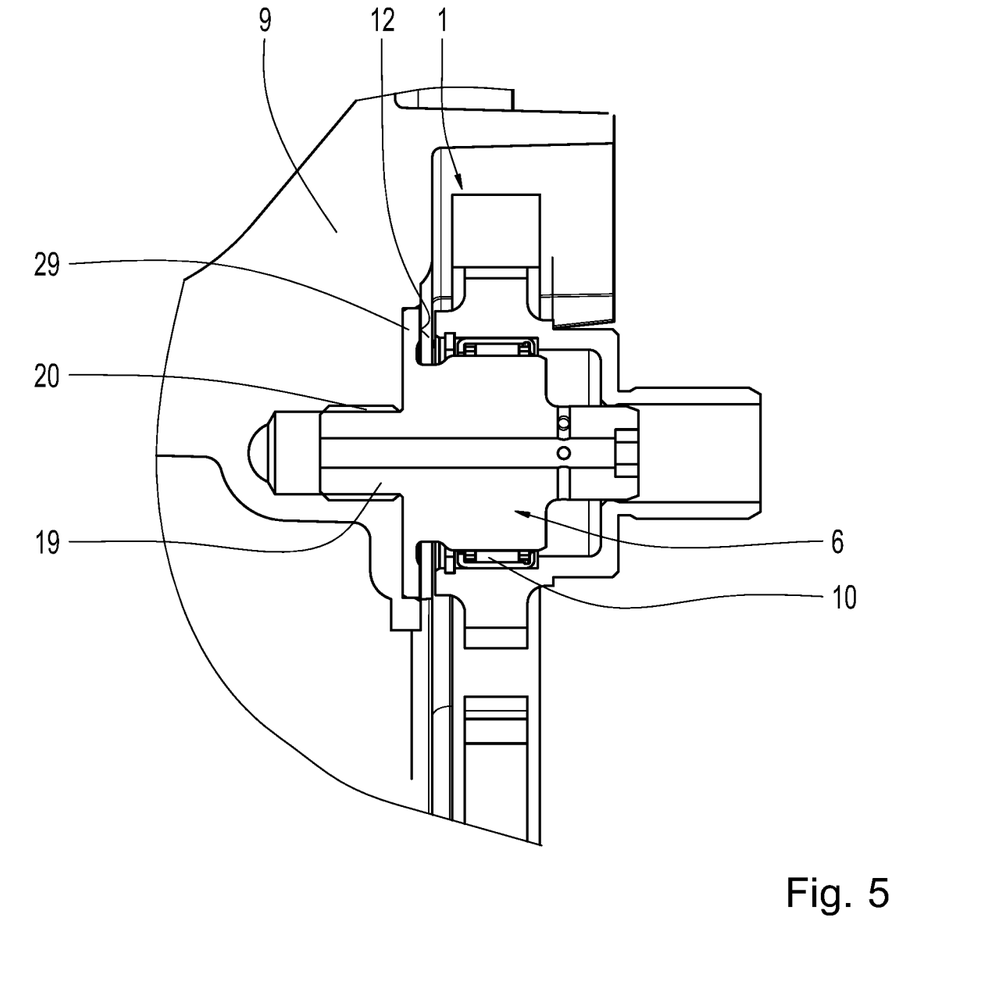
FIG. 5 shows an enlarged representation of one part of a flexible traction drive mechanism according to the invention, according to a fourth exemplary embodiment.

FIG. 5 shows an enlarged representation of one part of the flexible traction drive mechanism 1 according to a fourth exemplary embodiment. The represented flexible traction drive mechanism 1 differs from the flexible traction drive mechanism 1 represented in FIG. 1 in that the bearing journal 6 and the transmission housing 9 are not designed as a single piece, but rather as two pieces.

For example, the bearing journal 6 can be re-breakably connected, in particular bolted, to another fastening portion 20 of the transmission housing 9 by a fastening portion 19. The fastening portion 19 and the other fastening portion 20 each include a thread. The further oil line 32 is not represented in FIG. 5.

Yet another difference is that the flexible traction drive mechanism 1 according to the exemplary embodiment represented in FIG. 5 does not include a bush 11. The thrust race 12 is therefore an integral part of the bearing journal 6.

The flexible traction drive mechanism according to FIG. 5 can nevertheless include—as shown in FIG. 2—at least one additional bore hole 33 and/or at least one of the oil guide members 24, 26. The oil guide member 24 can be formed, for example, on the bearing journal 6.

Figure 6:
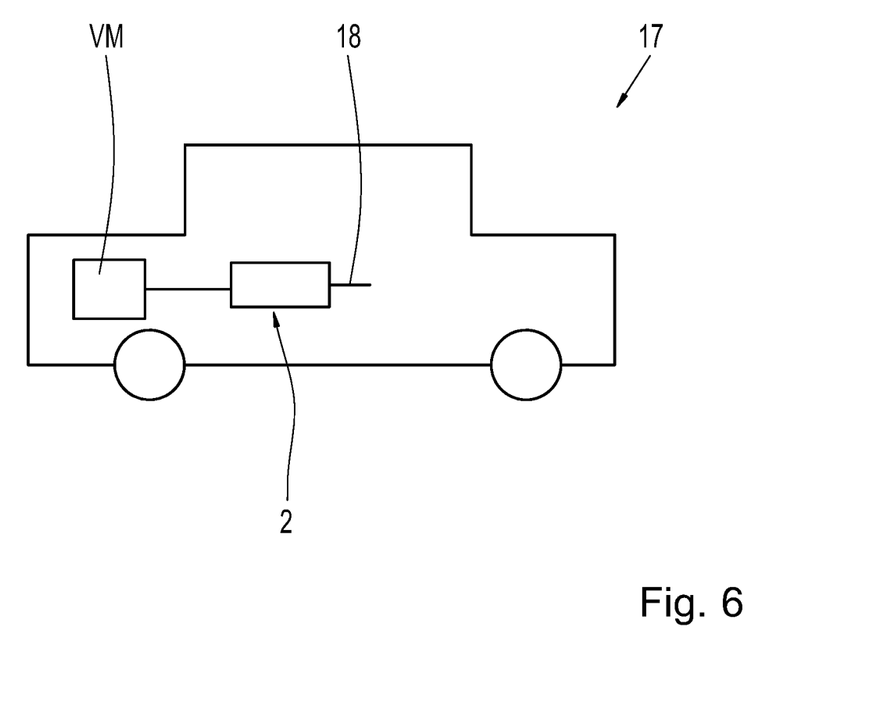
FIG. 6 shows a motor vehicle including the flexible traction drive mechanism according to the invention.

FIG. 6 shows a motor vehicle 17 including the motor vehicle transmission 2 according to the invention. As is apparent from FIG. 6, the motor vehicle transmission 2 is drivingly connected to the motor vehicle drive unit VM. The motor vehicle transmission 2 can be drivingly connected by the transmission output shaft 18 to other components of the motor vehicle 17, such as an axle differential which is not represented in the figures.

Modifications and variations can be made to the embodiments illustrated or described herein without departing from the scope and spirit of the invention as set forth in the appended claims.

REFERENCE CHARACTERS 1 flexible traction drive mechanism
2 motor vehicle transmission
3 first traction mechanism wheel
4 second traction mechanism wheel
5 traction mechanism
6 bearing journal
7 second transmission component
8 first transmission component
9 transmission housing
10 bearing
11 bush
12 thrust race
13 collar
14 bore hole
15 oil line
16 electric machine
17 motor vehicle
18 transmission output shaft
19 fastening portion
20 other fastening portion of the transmission housing
21 cavity
22 transmission input shaft 23 accommodating chamber
24 oil guide member
25 other bore hole
26 further oil guide member
27 connecting mechanism
28 coupling piece
29 support area
30 coupling portion
31 projection
32 further oil line
33 additional bore hole
34 O-ring
M central axis
HG main transmission
VM motor vehicle drive unit

The invention claimed is:

1. A flexible traction drive mechanism (1) for a motor vehicle transmission (2), comprising:
 a first traction mechanism wheel (3) rotationally fixable to a first transmission component (8);
 a second traction mechanism wheel (4) drivingly connected to the first traction mechanism wheel (3) by a traction mechanism (5), the second traction mechanism wheel (4) rotationally fixable to a second transmission component (7); and
 a bearing journal (6) supporting the first traction mechanism wheel (3),
 wherein the first traction mechanism wheel (3) is arranged such that the first traction mechanism wheel (3) is axially movable relative to the bearing journal (6), and
 wherein the bearing journal (6) is rotatably fixed relative to a transmission housing (9).

2. The flexible traction drive mechanism (1) of claim 1, wherein a diameter of the first traction mechanism wheel (3) is smaller than a diameter of the second traction mechanism wheel (4).

3. The flexible traction drive mechanism (1) of claim 1, wherein:
 the bearing journal (6) and the transmission housing (9) are a single piece;
 the bearing journal (6) comprises a fastening portion (19) which is removably connected, in a form-fit and/or friction-locking manner, to another fastening portion (20) of the transmission housing (9); or
 the flexible traction drive mechanism (1) comprises a connecting mechanism (27) which is at least partially enclosed by the bearing journal (6), the connecting mechanism (27) is removably connected to the bearing journal (6), and the bearing journal (6) is connectable to the transmission housing (9) in a form-fit and/or friction-locking manner with the connecting mechanism (27).

4. The flexible traction drive mechanism (1) of claim 1, further comprising a bearing (10), the first traction mechanism wheel (3) radially supported against the bearing journal (6) by the bearing (10).

5. The flexible traction drive mechanism (1) of claim 4, further comprising a thrust race (12) for the first traction mechanism wheel (3).

6. The flexible traction drive mechanism (1) of claim 5, wherein the bearing (10) rests directly on the bearing journal (6), and the thrust race (12) is integral with the bearing journal (6).

7. The flexible traction drive mechanism (1) of claim 5, further comprising a bush (11) that at least partially encloses the bearing journal (6), wherein the bearing (10) is radially supported on the bearing journal (6) by the bush (11), and the thrust race (12) is integral with the bush (11).

8. The flexible traction drive mechanism (1) of claim 7, wherein the bush (11) comprises a radially outwardly protruding collar (13), and the thrust race (12) is formed on the radially outwardly protruding collar (13).

9. The flexible traction drive mechanism (1) of claim 4, wherein an oil line (15) extends axially through the bearing journal (6), and oil from the oil line (15) is flowable through at least one bore hole (14) to the bearing (10).

10. The flexible traction drive mechanism (1) of claim 9, further comprising an oil guide member (24), wherein the oil guide member (24) is arranged and configured such that the oil guide member (24) diverts the oil which flows through the bearing (10) towards the traction mechanism (5).

11. The flexible traction drive mechanism (1) of claim 9, further comprising an oil guide member (24), wherein the oil guide member (24) is arranged on an end of a radially outwardly protruding collar (13) of a bush (11) that at least partially encloses the bearing journal (6), and the bearing (10) is radially supported on the bearing journal (6) by the bush (11).

12. The flexible traction drive mechanism (1) of claim 9, further comprising an oil guide member (24), wherein the oil guide member (24) is arranged on one or both of the bearing journal (6) and the transmission housing (9).

13. The flexible traction drive mechanism (1) of claim 9, wherein the first traction mechanism wheel (3) comprises at least one other bore hole (25) and an additional oil guide member (26), the at least one other bore hole (25) configured such that the oil which has flowed through the bore hole (14) flows out of the first traction mechanism wheel (3) through the at least one other bore hole (25), the additional oil guide member (26) configured to divert the oil which has flowed through the at least one other bore hole (25) towards the traction mechanism (5).

14. The flexible traction drive mechanism (1) of claim 9, wherein the first traction mechanism wheel (3) comprises at least one additional bore hole (33) through which the oil which has flowed through the bore hole (14) flows out of the first traction mechanism wheel (3) and through the first traction mechanism wheel (3) directly to a traction mechanism toothing formed on the first traction mechanism wheel (3).

15. A motor vehicle transmission (2) comprising the flexible traction drive mechanism (1) of claim 1, wherein the first traction mechanism wheel (3) is rotationally fixed to the first transmission component (8) and the second traction mechanism wheel (4) is rotationally fixed to the second transmission component (7).

16. The motor vehicle transmission (2) of claim 15, wherein the first transmission component (8) is a rotor shaft of an electric motor (16).

17. The motor vehicle transmission (2) of claim 16, wherein the second transmission component (7) is a shaft which is rotationally fixed to the second traction mechanism wheel (4) or is a clutch component.

18. The motor vehicle transmission (2) of claim 15, wherein the second transmission component (7) is a shaft which is rotationally fixed to the second traction mechanism wheel (4) or is a clutch component.

19. The motor vehicle transmission (2) of claim 15, wherein the first transmission component (8) is radially offset from the second transmission component (7).

20. A motor vehicle, comprising the flexible traction drive mechanism (1) of claim 1.

21. A motor vehicle, comprising the motor vehicle transmission (2) of claim 15.

\* \* \* \* \*

UNITED STATES PATENT AND TRADEMARK OFFICE
CERTIFICATE OF CORRECTION

| | |
|---|---|
| PATENT NO. | : 11,199,231 B2 |
| APPLICATION NO. | : 16/123403 |
| DATED | : December 14, 2021 |
| INVENTOR(S) | : Sven Holst and Uwe Firzlaff |

It is certified that error appears in the above-identified patent and that said Letters Patent is hereby corrected as shown below:

In the Claims

Claim 1 (Column 9, Line 31):
-- axially movable relative to the bearing journal (6), and -- should read -- axially movable relative to the bearing journal (6), --

Claim 1 (Column 9, Line 33):
-- to a transmission housing (9). -- should read -- to a transmission housing (9), and wherein the first traction mechanism wheel (3) is axially movable relative to the bearing journal (6) during operation of the flexible traction drive mechanism (1) when the first and second traction mechanism wheels (3, 4) are rotating in order to compensate for an axial offset between the first and second traction mechanism wheels (3, 4). --

Signed and Sealed this
Seventh Day of February, 2023

Katherine Kelly Vidal
*Director of the United States Patent and Trademark Office*